(12) United States Patent
Patterson et al.

(10) Patent No.: US 6,650,978 B1
(45) Date of Patent: Nov. 18, 2003

(54) METHOD AND APPARATUS FOR PRESERVING CALIBRATION DATA IN A VEHICLE SEAT OCCUPANT DETECTION SYSTEM

(75) Inventors: James F. Patterson, Greentown, IN (US); Charles A. Gray, Noblesville, IN (US); Jay W Higbee, Tipton, IN (US); John D. Scott, Commerce Twp., MI (US); Lee M Dziekan, Metamora, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/159,691

(22) Filed: May 31, 2002

(51) Int. Cl.[7] .............................. G06F 7/00; G06F 19/00
(52) U.S. Cl. ........................... 701/35; 701/45; 280/733; 280/730.2; 280/728.1; 180/288; 180/273; 369/13.39
(58) Field of Search ...................... 701/45, 35; 280/733, 280/730.2, 728.1, 730.1; 180/268, 273; 369/13.39

(56) References Cited

U.S. PATENT DOCUMENTS

| | | | | |
|---|---|---|---|---|
| 6,056,079 A | * | 5/2000 | Cech et al. | 180/273 |
| 6,076,853 A | * | 6/2000 | Stanley | 280/735 |
| 6,203,105 B1 | * | 3/2001 | Rhodes, Jr. | 297/284.6 |
| 6,220,627 B1 | * | 4/2001 | Stanley | 280/735 |
| 6,260,879 B1 | * | 7/2001 | Stanley | 280/735 |
| 6,283,504 B1 | * | 9/2001 | Stanley et al. | 280/735 |
| 2002/0059022 A1 | * | 5/2002 | Breed et al. | 701/45 |
| 2002/0082756 A1 | * | 6/2002 | Breed et al. | 701/45 |
| 2002/0161501 A1 | * | 10/2002 | Dulin et al. | 701/45 |

* cited by examiner

Primary Examiner—Thomas G. Black
Assistant Examiner—Ronnie Mancho
(74) Attorney, Agent, or Firm—Robert M. Sigler

(57) ABSTRACT

Dedicated memory locations for vehicle identification data and seat calibration data are provided in a first rewritable, non-volatile memory within an occupant detection system module and a second rewritable, non-volatile memory external to the occupant detection system. At least once each ignition cycle, preferably at power up, an algorithm responsive to vehicle identification data obtained from the vehicle, stored in the first rewritable, non-volatile memory and/or stored in the second rewritable, non-volatile memory, as well as the presence of seat calibration data in the first rewritable, non-volatile memory, controls the copying of seat calibration data and/or vehicle identification data between the first and second rewritable, non-volatile memories to preserve seat calibration data for a vehicle through replacement of the occupant detection system module or the entire occupant detection system.

10 Claims, 7 Drawing Sheets

METHOD AND APPARATUS FOR PRESERVING CALIBRATION DATA IN A VEHICLE SEAT OCCUPANT DETECTION SYSTEM

TECHNICAL FIELD

The technical field of this invention is a vehicle occupant protection system and particularly an occupant detection system for a vehicle seat.

BACKGROUND OF THE INVENTION

Vehicle occupant protection systems are beginning to include occupant detection and characterization systems for helping to decided whether or how to deploy an airbag in a crash event. At least one such system provides an occupant characteristic sensor in a vehicle seat member to determine the weight of a seat occupant. The determination is made by a programmed computer provided in an occupant detection system module, the computer having an input connection from a seat characteristic sensor such as a fluid pressure sensor connected to a fluid filled bladder on the seat pan under the bottom seat cushion member. The output signal from the sensor is compared with calibrated threshold values to characterize a detected seat occupant.

The calibrated threshold values are initially determined in calibration tests of the occupant detection system, which includes the seat cushion member, bladder, sensor and occupant detection system module, and are typically stored in rewritable, non-volatile memory such as EEPROM in the occupant detection system module to allow updating during vehicle operation, service or recalibration. If service of the system requires part replacement, there are typically two alternative replacement modes: (1) replacement of the entire system, including seat member, bladder, sensor and module, or (2) replacement of the module alone. The latter mode of replacement will result in loss of the calibrated threshold values with the discarded module unless additional steps are taken, such as specifically copying these values to the new module or recalibrating the system. But a defect in the replaced module may prevent access to the stored calibrated threshold values; and recalibration requires special equipment not generally available outside manufacturing facilities.

SUMMARY OF THE INVENTION

This invention is a method and apparatus for preserving seat calibration data such as the calibrated threshold values in an occupant detection system in an automatic manner, regardless of which replacement mode is performed. The invention provides dedicated memory locations for vehicle identification data and seat calibration data in a first rewritable, non-volatile memory within an occupant detection system module and a second rewritable, non-volatile memory external to the occupant detection system. The second rewritable, non-volatile memory may, in a preferred embodiment, be located within an airbag control module that is separately replaceable in the vehicle with respect to the occupant detection system.

In one aspect of the invention, vehicle identification data is obtained from the vehicle. If the vehicle identification data obtained from the vehicle matches vehicle identification data stored in the first rewritable, non-volatile memory, seat calibration data stored in the first rewritable, non-volatile memory is copied to the second rewritable, non-volatile memory.

In another aspect of the invention, vehicle identification data is obtained from the vehicle. If (a) there is vehicle identification data in the first rewritable, non-volatile memory and (b) the vehicle identification data obtained from the vehicle does not match the vehicle identification data stored in the first rewritable, non-volatile memory and (c) the vehicle identification data obtained from the vehicle matches vehicle identification data stored in the second rewritable, non-volatile memory, then seat calibration data stored in the second rewritable, non-volatile memory and one of the vehicle identification data obtained from the vehicle and the vehicle identification data stored in the second rewritable, non-volatile memory is copied to the first rewritable, non-volatile memory.

In another aspect of the invention, vehicle identification data is obtained from the vehicle. If (a) there is no vehicle identification data stored in the first rewritable, non-volatile memory, and (b) there is seat calibration data stored in the first rewritable, non-volatile memory, then (a) the vehicle identification data obtained from the vehicle is copied to the first rewritable, non-volatile memory and to the second rewritable, non-volatile memory and (b) the seat calibration data in the first rewritable, non-volatile memory is copied to the second rewritable, non-volatile memory.

In yet another aspect of the invention, vehicle identification data is obtained from the vehicle. If (a) there is no vehicle identification data stored in the first rewritable, non-volatile memory and (b) there is no seat calibration data stored in the first rewritable, non-volatile memory and (c) the vehicle identification data obtained from the vehicle matches the vehicle identification data stored in the second rewritable, non-volatile memory, then seat calibration data stored in the second rewritable, non-volatile memory and one of the vehicle identification data obtained from the vehicle and the vehicle identification data stored in the second rewritable, non-volatile memory is copied to the first rewritable, non-volatile memory.

In a preferred embodiment of the invention, the second rewritable, non-volatile memory may be located in an airbag control module separately packaged and replaceable with respect to the occupant detection system.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
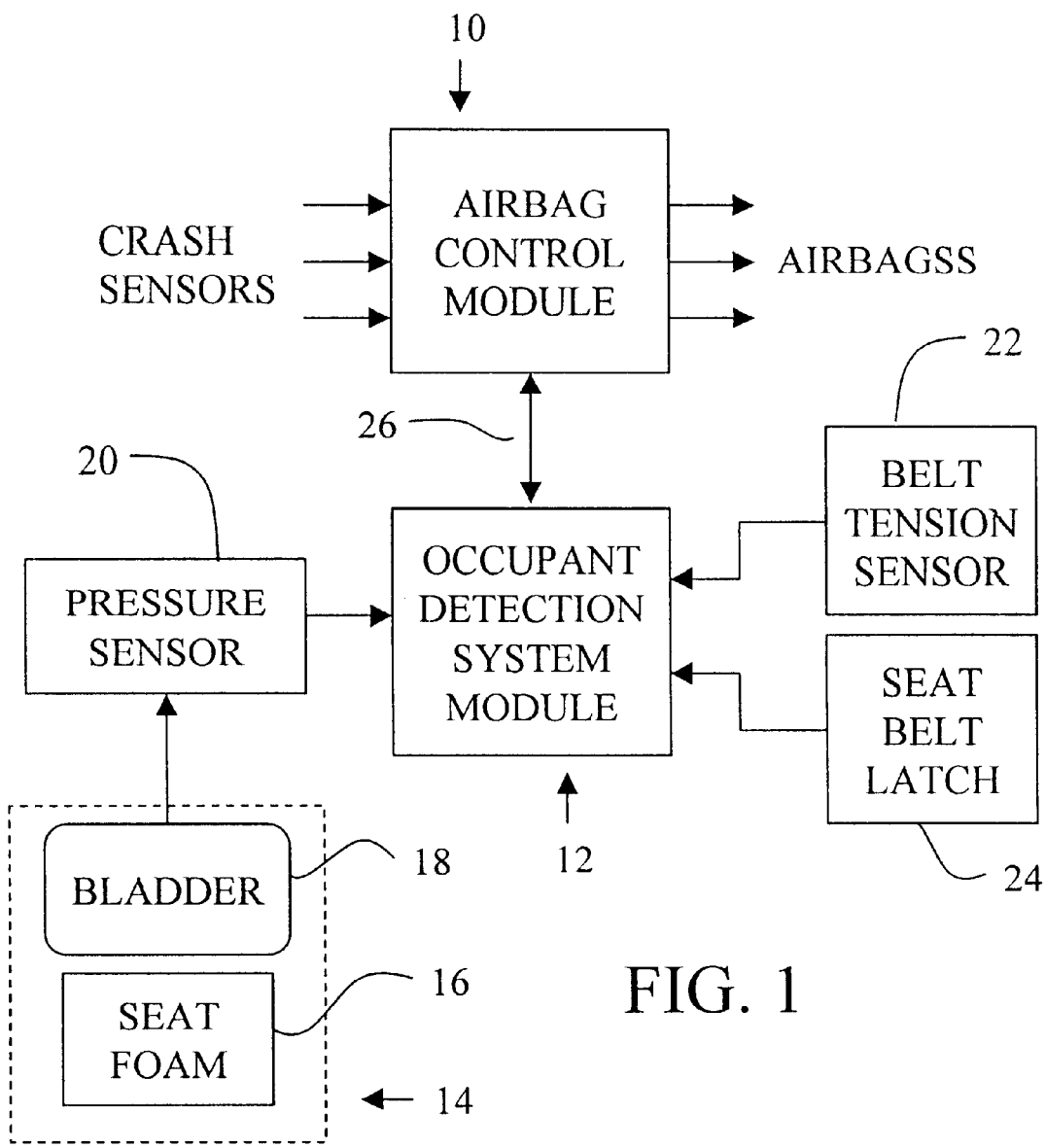
FIG. 1 is a block diagram of a vehicle passive restraint deployment control system including a seat occupant detection system.

A vehicle passive restraint control system comprises an airbag control module (ACM) 10 that receives signals from crash sensors, not shown, and provides deploy signals as required to airbags, not shown. The crash sensors and airbags may be any such articles known in the art for use in vehicle restraint systems. A vehicle seat 14 is provided with a seat cushion member 16, generally comprising a shaped block of foamed material providing a comfortable seating support, usually covered in a fabric for appearance. A bladder 18 packaged with seat cushion member 16 is typically located under seat cushion member 16 but above a seat pan member, not shown, and is filled with a non-compressible fluid so as to generate a pressure in the fluid in response to the weight of a seat occupant on the seat cushion member. The pressure in the fluid is sensed by a pressure sensor 20 that, together with bladder 18, forms a seat characteristic sensor apparatus providing an output signal of the weight born by seat cushion member 16. This output signal is provided to an occupant detection system (ODS) module 12 that includes a computer programmed to determine the occupancy status of the seat according to predetermined, stored calibrated classification thresholds. Additional signals involved in such determination may be provided by, for example, a seat belt tension sensor 22 and/or a switch in a seat belt latch 24. ACM 10 and ODS module 12 are adapted to communicate with each other over a communication bus 26, such as a standard vehicle communication bus, which also permits communication with other modules in the vehicle having memory.

Due to variations in seat foam, bladders, sensors and other physical parameters, each system is calibrated after assembly with a particular seat cushion member; and the calibrated threshold values are stored in memory within ODS module 12. These parameters may be changed by the ODS module during subsequent vehicle operation as characteristics change over time. For example, seat foam material changes its physical characteristics with age and is also subject to changes with environmental parameters. In a calibration process for a particular vehicle seat, one or more objects of predetermined weight and shape are dropped in a predetermined manner onto the installed seat cushion member to generate pressure readings for storage as the calibrated threshold values for determining the boundaries between occupant classifications. For the restraint deployment control to continue to meet its mandated operational standards, these calibrated threshold values must always be present for use; and it is also desired that they be updated as required to compensate for variations in physical and environment seat characteristics over time.

Figure 2:
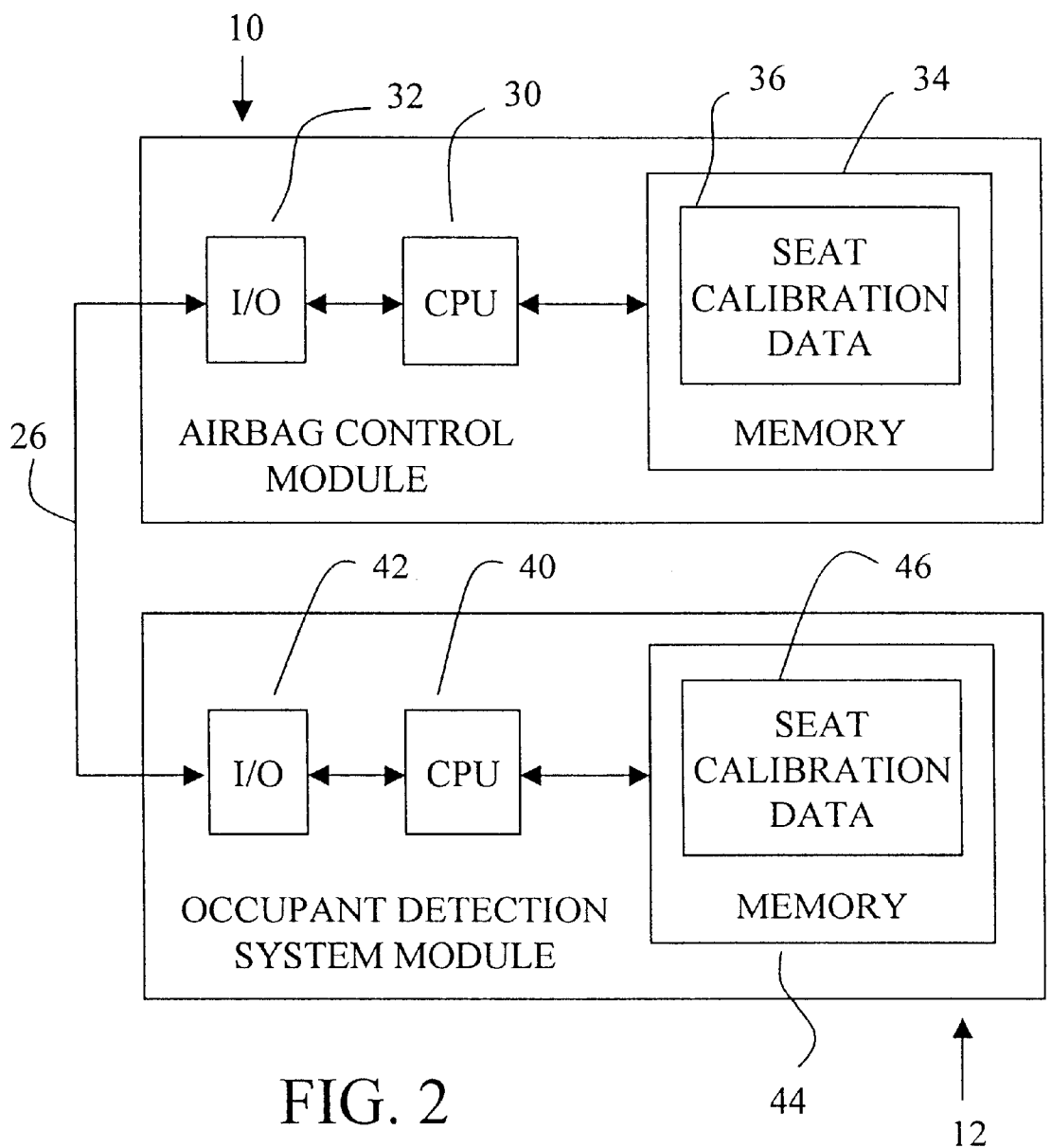
FIG. 2 is a block diagram of a portion of the system of FIG. 1.

FIG. 2 shows greater detail of modules 10 and 12 in the areas of communication and memory. ACM 10 has a central processing unit (CPU) 30, input/output (I/O) apparatus 32, and memory apparatus 34, which comprises at least RAM and rewritable, non-volatile memory such as EEPROM, a portion (ACM memory 36) of the latter being dedicated to vehicle identification data and seat calibration data. ODS module 12 similarly has a central processing unit (CPU) 40, input/output (I/O) apparatus 42, and memory apparatus 44, which comprises at least RAM and rewritable, non-volatile memory such as EEPROM, a portion (ODS memory 46) of the latter being dedicated to vehicle identification data and seat calibration data. The seat calibration data in ODS memory 46 is updated as required by CPU 40 in ODS module 12 during vehicle operation; and the updated data is communicated to CPU 30 of airbag control module 10, which stores it in ACM memory 36. The communication of seat calibration data from ODS module 12 to ACM 10 occurs at least once each ignition cycle, preferably at power up of the modules; but it may occur during vehicle operation if desired.

Figure 3A:
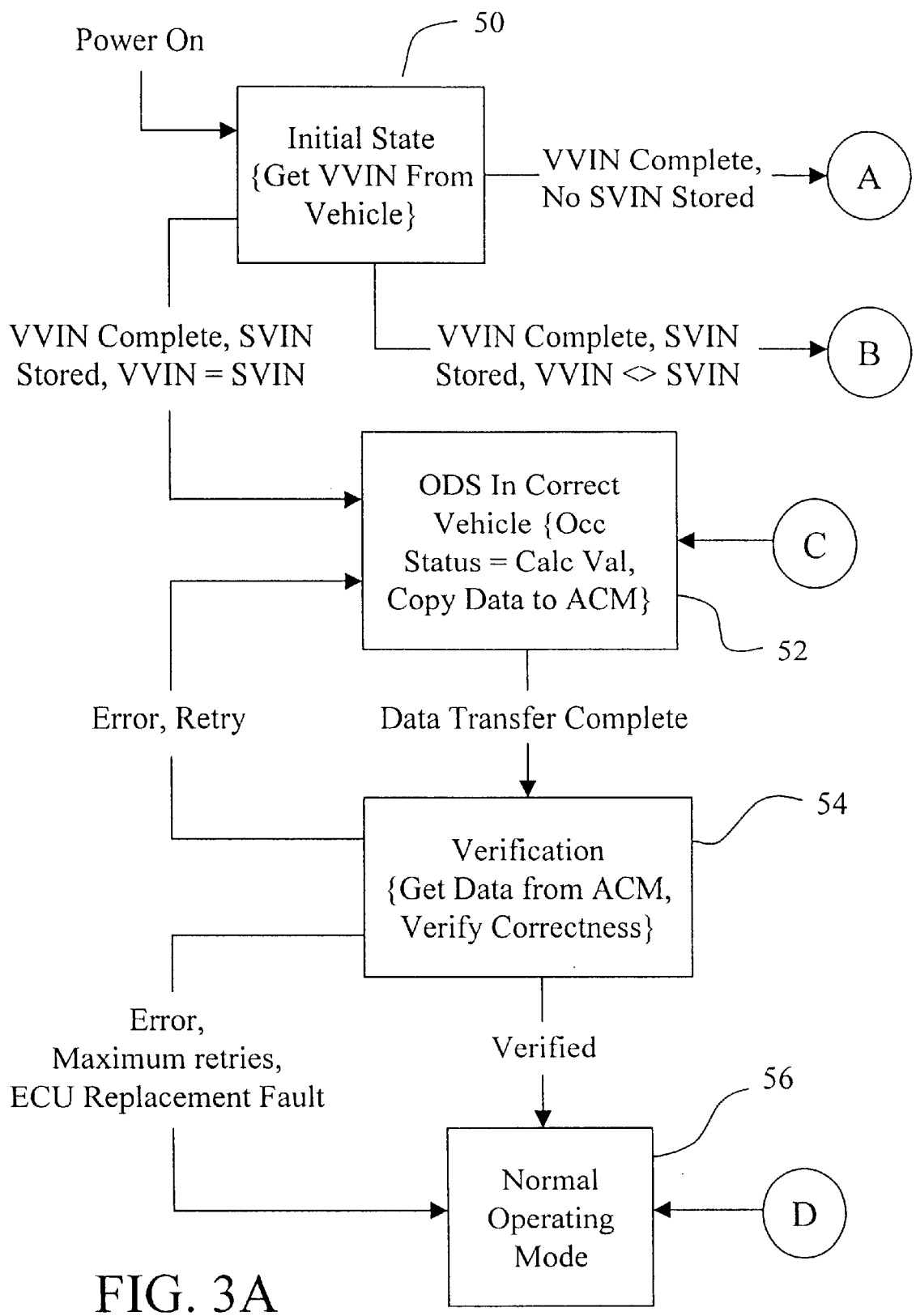
FIGS. 3A and 3B together form a state diagram useful in illustrating the operation of system of FIGS. 1 and 2.
Figure 3B:
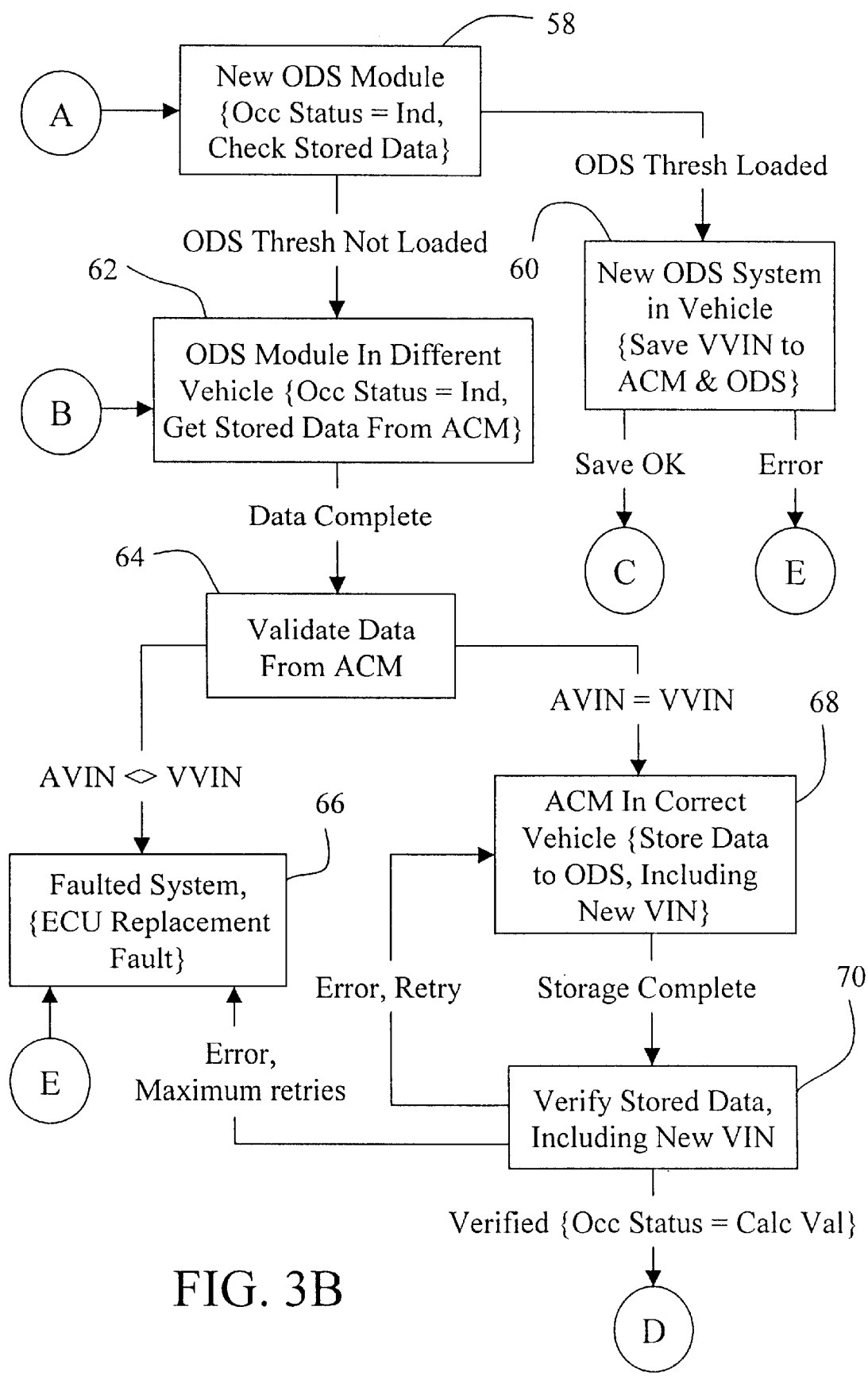

As with any system in a vehicle, the occupant detection system is subject to failures of parts requiring repair and/or replacement. In the system of this embodiment, there are two replacement modes for the occupant detection system: (1) the entire system, including seat cushion member 16, bladder 18, pressure sensor 20 and ODS module 12, may be replaced as a unit, or (2) ODS module 12 alone may be replaced. Additionally, the ACM is replaceable separately with respect to any portion of the occupant detection system as part of other repair procedures. In any of these repair procedures, a replacement module will typically not contain the specific seat calibration data of the module being replaced. A procedure for automatically preventing loss of such data is described with respect to the state diagram of FIGS. 3A–3B.

When power is applied to ODS module 12 (and ACM) at the beginning of a vehicle ignition cycle, ODS module 12 enters an initial state 50 and queries the vehicle on bus 26 for vehicle identification data: specifically, the vehicle identification number. This number, which will be called VVIN, will be permanently stored in another module on the vehicle, e.g. the engine control module, that is also connected to bus 26. In initial state 50, the number is temporarily stored in ODS module RAM and is compared with vehicle identification data comprising a vehicle identification number SVIN stored in ODS memory 46, if there is such a stored number. In typical vehicle operation, a number SVIN will be stored and will match VVIN; and the system will proceed to state 52, in which the ODS module 12 has been identified as being in the correct vehicle. In state 52, an occupant status flag OCC STATUS is set to CALC VAL, which will cause the occupant detection system in normal operation to calculate the occupant status and pass on the calculated value to ACM 10 for use in determining airbag deployment. In addition, at step 52, the seat calibration data, comprising calibrated threshold values, in ODS memory 46 is sent over bus 26 to ACM 10 for storage in ACM memory 36. When this storage is complete, the system enters state 54; and the transfer is verified by comparing AVIN, the vehicle identification data just written to and stored in ACM 10, with SVIN, the vehicle identification data stored in ODS module 12. If the storage is verified, a copy of the calibrated threshold values for the occupant detection system will be available in ACM memory 36 for copying back into a replacement ODS module 12. If an error is detected, the system returns to state 52 and repeats the transfer; and this return and repeat will continue to occur until the transfer is verified or for a predetermined maximum number of retries. When either verification or the maximum number of retries has occurred, the system will enter state 56, the normal operating mode; but an ECU Replacement Fault will be declared if the maximum number of retries resulted in no verification. In the normal operating mode, vehicle operation may proceed, but an ECU Replacement Flag is set to modify vehicle operation in an appropriate manner.

Returning in this description to the initial state 50, if there is no vehicle identification data SVIN stored in ODS memory 46, the system enters state 58, with the recognition that the ODS module has been replaced. In state 58, the occupant status flag OCC STATUS is reset to IND, which means indeterminate. This indicates that an occupant status value should not be calculated by ODS module 12, and thus causes, for example, suppression of deployment of the airbag associated with seat 14, with warning given to the vehicle occupants. The stored seat calibration data in ODS memory 46 is then checked for calibrated threshold values in state 58. If they are present, it is inferred that an entire calibrated occupant detection system (seat cushion 16, bladder 18, pressure sensor 20 and ODS module 12) has been replaced in the vehicle (or initially placed in the vehicle with the seat 14 during vehicle assembly). The system thus enters state 60, in which the vehicle identification number VVIN, which was obtained from the vehicle and stored in RAM in state 50, is stored in the memories of both ODS module 12 and ACM 10. If these saves are complete and verified, the system proceeds to state 52 to change the OCC STATUS flag to CALC VAL and copy the seat calibration data in ODS memory 46 to ACM memory 36. From state 52, the system then proceeds to state 54 and, if the transfer is verified, to Normal Operating Mode in state 56 as previously described with an original or replacement occupant detection system. But, returning in this description to state 60, if the copying of vehicle identification data is not complete and verified, the system alternatively enters a faulted system state 66; and a FAULT flag is set. The system will not leave faulted system state 66 until it is serviced.

Returning in this description to state 58, if no calibrated threshold values are found in ODS memory 46, it means that an ODS module has been replaced without being calibrated to an occupant detection system. This typically means that a new ODS module 12 has been replaced in an existing and calibrated ODS system. The ODS module will thus require storage of both the vehicle identification number VVIN and any calibrated threshold values stored in ACM memory 36. This will also be required if, in state 50, it is determined that there is a stored vehicle identification number SVIN in ODS memory 46 but it does not match VVIN obtained from the vehicle. This situation can arise if a replacement ODS module has been removed from an occupant detection system in a different vehicle. In either case, the system enters state 62, with recognition that the ODS module is in a new vehicle with calibrated threshold values stored in ACM 10. But no copying of calibrated threshold values from ACM 10 to ODS module 12 is desired unless ACM 10 is verified as being in the correct vehicle. Thus, in state 62, the system obtains vehicle identification data AVIN from ACM memory 36. When the data is obtained, the system enters state 64 and validates AVIN against VVIN stored in RAM. If no match is obtained, the system enters the faulted system state 66. But if a match is obtained in state 64, ACM is validated as being in the correct vehicle; and the calibrated threshold values therein are considered correct. Thus, the system enters state 70; and the calibrated threshold values from ACM memory 36, as well as either of vehicle identification data AVIN from ACM memory 36 or vehicle identification data VVIN obtained from the vehicle (which have been found identical) are copied to ODS memory 46. When the storage is complete, the system enters state 72 and the stored data is verified. If verification fails, the storage is retried, up to a predetermined maximum number of times. If the verification succeeds, the system enters state 56, the normal operating mode. If the verification ultimately fails, the system enters the defaulted system state 66; and the ECU Replacement flag is set.

Figure 4:
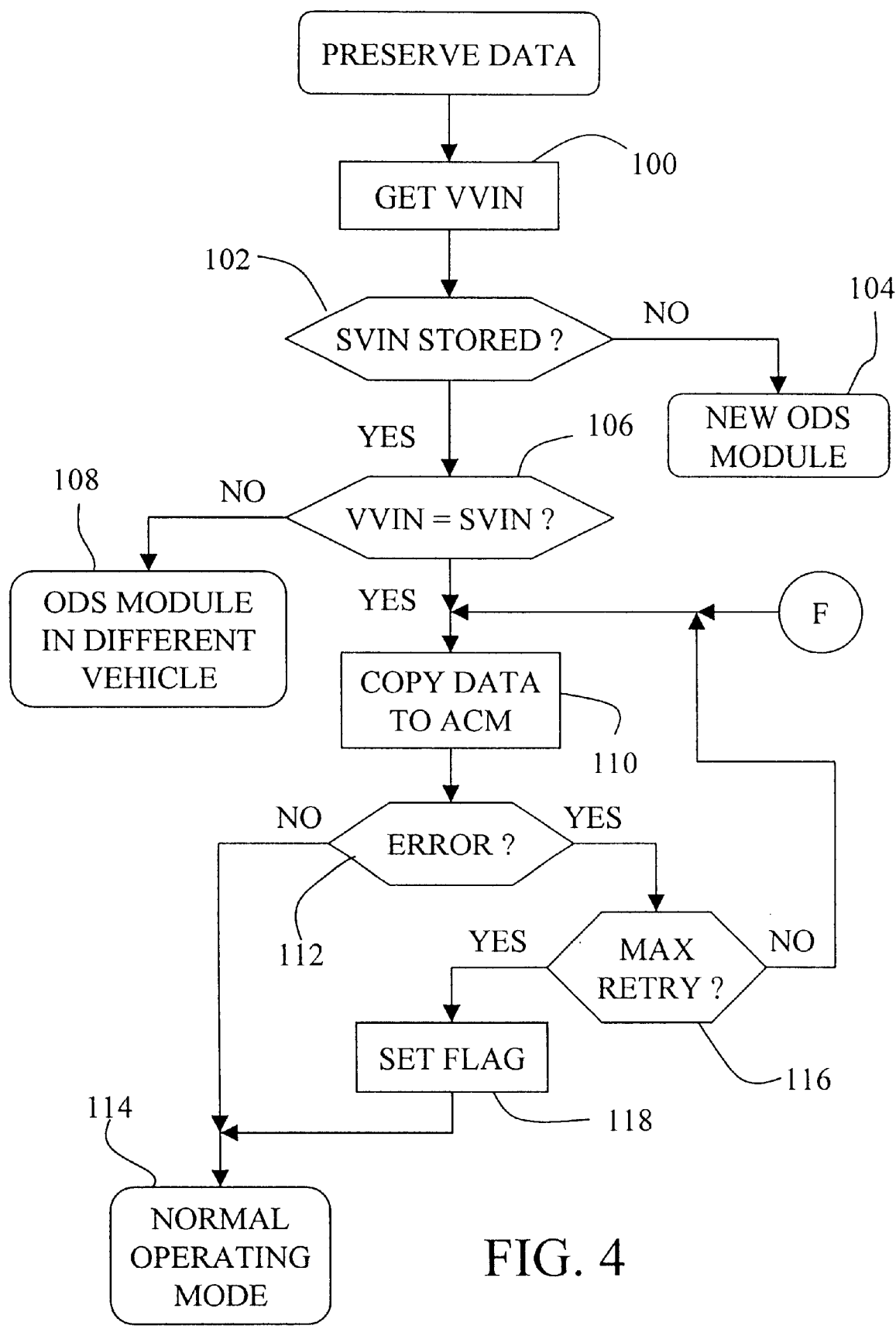
Figure 5:
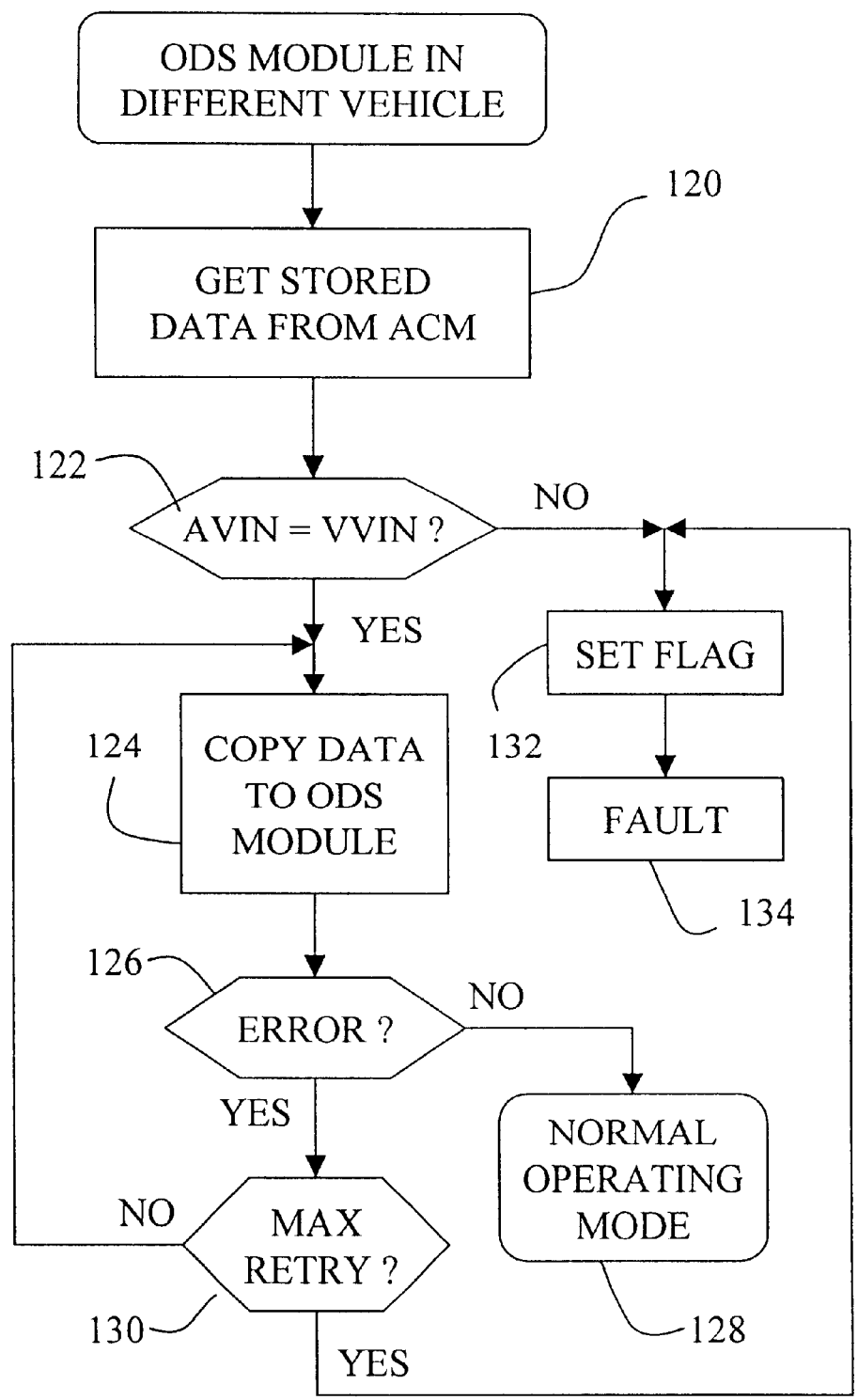
FIGS. 5–6 are process flow diagrams describing the operation of an occupant detection module within the system of FIGS. 1 and 2.
Figure 6:
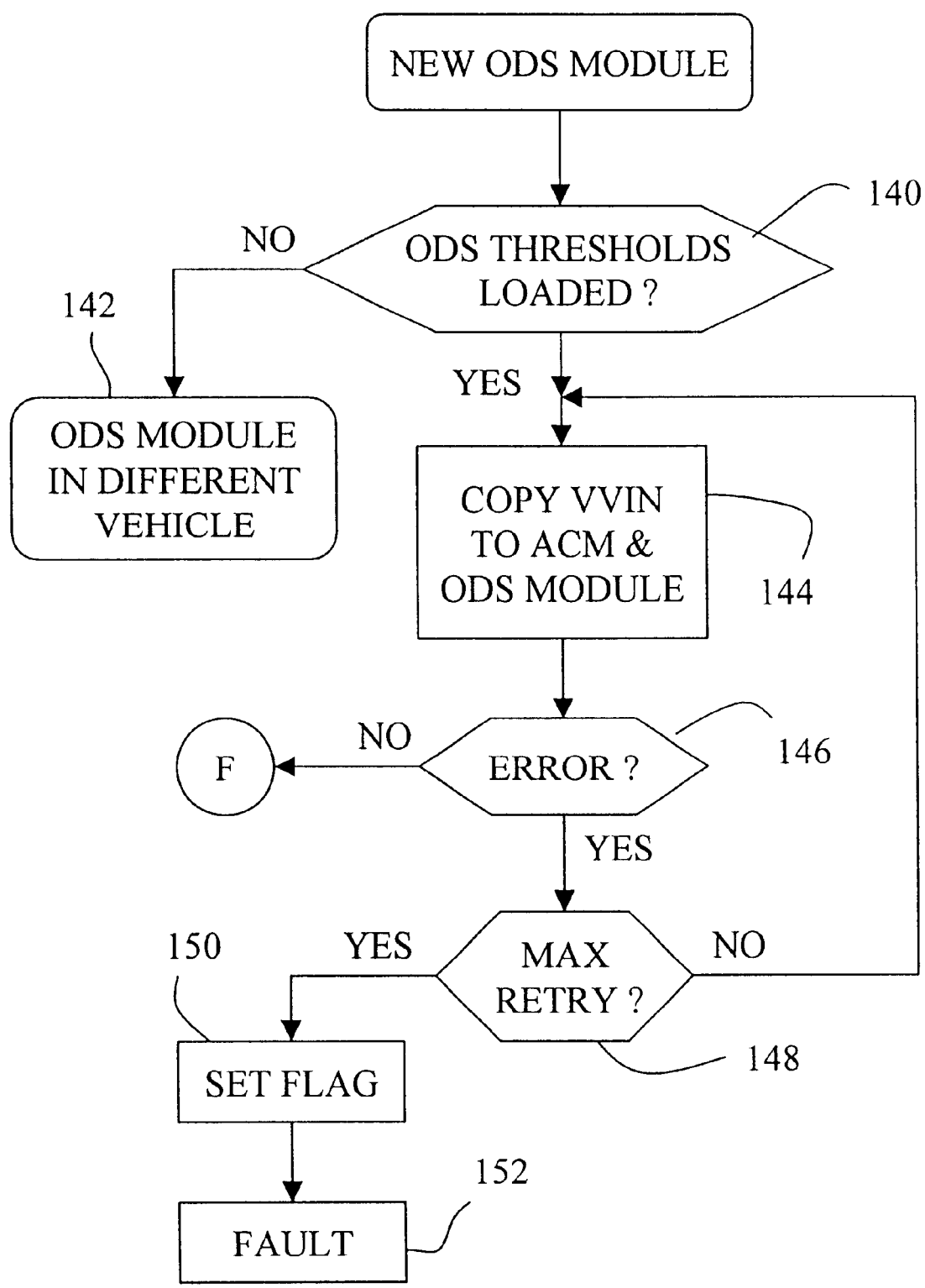

FIGS. 4–6 show flow charts illustrating the operation of ODS module 12 in the process of this invention. FIG. 4 shows a routine PRESERVE DATA, which is run at power up of the module, which occurs at the beginning of each vehicle ignition cycle. The routine begins at step 100 by placing a request on the vehicle bus 26 for the vehicle identification data VVIN, which is stored permanently in a vehicle memory such as, typically, the vehicle engine control module, and receiving the requested data. The received vehicle identification data VVIN is held in ODS module RAM. Next, at step 102, the routine requests vehicle identification data SVIN from memory locations in ODS memory 46 dedicated to that data. If such data are not stored therein, at step 104 the routine calls a routine NEW ODS MODULE, which will be described below. But if the required data is provided, the routine proceeds to step 106, wherein it compares vehicle identification data SVIN from ODS module EEPROM with vehicle identification data VVIN from the vehicle. If they do not match, at step 108 the routine calls a routine ODS MODULE IN DIFFERENT VEHICLE, which will be described below. But if they do match, it means that the ODS module is in the correct vehicle; and the routine proceeds to step 110, wherein it obtains seat calibration data such as calibrated threshold values from ODS memory 46 and places this data on bus 26 for copying into ACM memory 36 (or any other rewritable, non-volatile memory not replaced with the occupant detection system). The routine then verifies the data transfer at step 112 by requesting the same data back from ACM memory 36 (or wherever else it is stored) and comparing it with the data in ODS memory 46. If there is no error, the routine proceeds to NORMAL OPERATING MODE at step 114, which represents the rest of the operating process of the ODS module during the ignition cycle. If an error occurs, the routine will repeat the copy and verification up to a predetermined number of times. Thus, the routine keeps track of the number of retries in a software counter, not shown; and, in the case of an error determined at step 112, the routine checks for the maximum retry count at step 116. If the maximum number has not been reached, the routine increments the retry count and returns to step 110 to try again. When the maximum retry count is detected at step 116, the routine sets an ECU REPLACEMENT FAULT flag at step 118 and then proceeds to NORMAL OPERATION at 114. The ECU REPLACEMENT FAULT flag is insufficient to stop operation of the occupant detection system, since ODS memory 46 contains the required calibrated threshold values; but a warning will be provided for service, since the calibrated threshold values in ACM 10 are not verified.

Routine ODS MODULE IN DIFFERENT VEHICLE is described with reference to the flow chart of FIG. 5. It begins at step 120 by placing a request on bus 26 for the seat calibration data and vehicle identification data AVIN stored in ACM memory 36. When the data is received, the routine proceeds at step 122 to compare the vehicle identification data AVIN from ACM memory 36 with vehicle identification data VVIN from the vehicle. If AVIN matches VVIN, it verifies that ACM 10 is in the proper vehicle. ACM 10 is thus presumed to contain the correct calibrated threshold values for seat 14, and only ODS module 12 is new to the vehicle. Thus, at step 124, the routine copies the data received from ACM memory 36, both the calibrated threshold values and the vehicle identification data, to ODS module 12. Alternatively to AVIN, the routine could copy VVIN, since the two have been found to match. When this is accomplished, the routine requests verification at step 126 by comparing the calibrated threshold values in ACM memory 36 and ODS memory 46. If they match (no error), the routine is exited at step 128 to NORMAL OPERATING MODE. If they do not match (error), the routine proceeds to step 130, in which the routine checks for a maximum retry count. If a maximum retry count is not reached, the routine increments the retry count and returns to step 124 for another attempt at copying and verifying the data. But if the maximum retry count is reached, the routine proceeds to step 132, wherein the ECU REPLACEMENT FAULT flag is set, and then to step 134, where further operation of the occupant detection system is halted in a fault condition with the further setting of a FAULT CONDITION flag until required service is performed. Unlike the case at step 112 of FIG. 4, in which the seat calibration data in ODS 12 is known to be correct, in the case of step 126 the correct seat calibration data could not be copied correctly into ODS module 12 from ACM 10. The occupant detection system cannot be operated correctly without correct seat calibration data in ODS module 12.

Returning in the description to step 122, if AVIN does not match VVIN, then neither ACM 10 nor ODS module 12 contains the correct vehicle identification data VVIN. This means that both modules are new to the vehicle and contain no verified seat calibration data. Thus, the occupant detection system cannot be correctly operated; and the routine proceeds to step 132, wherein the FAULT flag is set, and then to the fault condition at 134, where further operation is halted until required service is performed.

Routine NEW ODS MODULE is described with reference to the flow chart of FIG. 6. It begins at step 140 by determining if calibrated threshold values are loaded in ODS memory 46. If not, ODS module 12 is presumed to be new; and the routine is exited at step 142 to routine ODS MODULE IN DIFFERENT VEHICLE for further processing as described above with reference to FIG. 5. It is noted that the routine will reach routine ODS MODULE IN DIFFERENT VEHICLE either from step 106 in FIG. 4, if the vehicle identification SVIN in ODS memory 46 does not match the vehicle identification VVIN obtained from the vehicle itself, or from step 140 in FIG. 6, if there are no calibrated threshold values in ODS memory 46. In either case, valid seat calibration data for the vehicle in ODS are not found in ODS memory 46.

Returning to FIG. 6, if ODS memory 46 is found to contain calibrated threshold values at step 140, the routine proceeds at step 144 to copy vehicle identification data VVIN from RAM to ODS memory 46 of ODS module 12 and to ACM memory 36 of ACM 10. This data transfer is then verified at step 146 by reading back each value and comparing to VVIN in RAM for a match. If there is no error, the routine is exited at step 146, through connecting reference point F in FIG. 6 and FIG. 4, to step 110 of FIG. 4. At step 110, as previously described, the seat calibration data in ODS memory 46 is copied to ACM memory 36, and the data transfer is verified in steps 112, 116 and 118 and the routine exits to NORMAL OPERATING MODE at step 114, with a Fault flag set at step 118 if an error is detected. Returning in the description to step 146 of NEW ODS MODULE, a detected error leads to a return through step 144 for a retry until a maximum error count is reached, whereupon the ECU REPLACEMENT FAULT flag is set at step 150 and a Fault condition is entered with a setting of the FAULT CONDITION flag at step 152, whereupon further operation is halted until required service is performed.

What is claimed is:

1. A method of preserving calibration data for use by a seat occupant detection system in a vehicle, the method comprising the steps:

providing dedicated memory locations for vehicle identification data and seat calibration data in a first rewritable, non-volatile memory within an occupant detection system module in the seat occupant detection system and a second rewritable, non-volatile memory external to the occupant detection system;

obtaining vehicle identification data from the vehicle;

determining if the vehicle identification data obtained from the vehicle matches vehicle identification data stored in the first rewritable, non-volatile memory; and if the vehicle identification data obtained from the vehicle matches the vehicle identification data stored in the first rewritable, non-volatile memory, copying seat calibration data stored in the first rewritable, non-volatile memory to the second rewritable, non-volatile memory.

2. A method of preserving calibration data for use by a seat occupant detection system in a vehicle, the method comprising the steps:

providing dedicated memory locations for vehicle identification data and seat calibration data in a first rewritable, non-volatile memory within an occupant detection system module within the seat occupant detection system and a second rewritable, non-volatile memory external to the occupant detection system;

obtaining vehicle identification data from the vehicle;

determining if there is vehicle identification data in the first rewritable, non-volatile memory;

if there is vehicle identification data in the first rewritable, non-volatile memory, determining if the vehicle identification data from the vehicle matches the vehicle identification data stored in the first rewritable, non-volatile memory; and if the vehicle identification data obtained from the vehicle matches the vehicle identification data stored in the first rewritable, non-volatile memory, copying seat calibration data stored in the first rewritable, non-volatile memory to the second rewritable, non-volatile memory.

3. The method of claim 2 further comprising the steps:

if the vehicle identification data obtained from the vehicle does not match the vehicle identification data stored in the first rewritable, non-volatile memory, determining if the vehicle identification data obtained from the vehicle matches vehicle identification data stored in the second rewritable, non-volatile memory; and if the vehicle identification data obtained from the vehicle matches the vehicle identification data stored in the second rewritable, non-volatile memory, copying seat calibration data stored in the second rewritable, non-volatile memory and one of the vehicle identification data obtained from the vehicle and the vehicle identification data stored in the second rewritable, non-volatile memory to the first rewritable, non-volatile memory.

4. The method of claim 2 further comprising the steps:

if there is no vehicle identification data stored in the first rewritable, non-volatile memory, determining if there is seat calibration data stored in the first rewritable, non-volatile memory; and if there is seat calibration data stored in the first rewritable, non-volatile memory, copying the vehicle identification data obtained from the vehicle to the first rewritable, non-volatile memory and to the second rewritable, non-volatile memory and copying the seat calibration data in the first rewritable, non-volatile memory to the second rewritable, non-volatile memory.

5. The method of claim 2 further comprising the steps:

if there is no vehicle identification data stored in the first rewritable, non-volatile memory, determining if there is seat calibration data stored in the first rewritable, non-volatile memory;

if there is no seat calibration data stored in the first rewritable, non-volatile memory, determining if the vehicle identification data obtained from the vehicle matches vehicle identification data stored in the second rewritable, non-volatile memory; and if the vehicle identification data obtained from the vehicle matches vehicle identification data stored in the second rewritable, non-volatile memory; copying seat calibration data stored in the second rewritable, non-volatile memory and one of the vehicle identification data obtained from the vehicle and the vehicle identification data stored in the second rewritable, non-volatile memory to the first rewritable, non-volatile memory.

6. A vehicle seat calibration data preservation apparatus comprising, in combination:

a seat member having seat characteristic sensor apparatus;

an occupant detection system module having a first rewritable, non-volatile memory; the seat member and occupant detection system module together comprising a seat occupant detection system; and a second rewritable, non-volatile memory separately replaceable with respect to the seat member and the occupant detection system module;

the occupant detection system module further comprising means for:

(a) obtaining vehicle identification data from the vehicle, (b) determining if there is vehicle identification data stored in the first rewritable, non-volatile memory;

(c) if there is vehicle identification data in the first rewritable, non-volatile memory, determining if the vehicle identification data obtained from the vehicle matches the vehicle identification data stored in the first rewritable, non-volatile memory, and (d) if the vehicle identification data obtained from the vehicle matches the vehicle identification data stored in the first rewritable, non-volatile memory, copying seat calibration data stored in the first rewritable, non-volatile memory to the second rewritable, non-volatile memory.

7. A vehicle seat calibration data preservation apparatus according to claim 6, wherein the occupant detection system module further comprises:

(e) means, responsive to the vehicle identification data obtained from the vehicle not matching the vehicle identification data stored in the first rewritable, non-volatile memory, for determining if the vehicle identification data obtained from the vehicle matches vehicle identification data stored in the second rewritable, non-volatile memory; and (f) means, responsive to the vehicle identification data obtained from the vehicle matching the vehicle identification data stored in the second rewritable, non-volatile memory; for copying seat calibration data stored in the second rewritable, non-volatile memory and one of the vehicle identification data obtained from the vehicle and the vehicle identification data stored in the second rewritable, non-volatile memory to the first rewritable, non-volatile memory.

8. A vehicle seat calibration data preservation apparatus according to claim 6, wherein the occupant detection system module further comprises:

(g) means, responsive to there being no vehicle identification data stored in the first rewritable, non-volatile memory, for determining if there is seat calibration data stored in the first rewritable, non-volatile memory; and (h) means, responsive to the presence of seat calibration data stored in the first rewritable, non-volatile memory, for copying the vehicle identification data obtained from the vehicle to the first rewritable, non-volatile memory and to the second rewritable, non-volatile memory and copying the seat calibration data in the first rewritable, non-volatile memory to the second rewritable, non-volatile memory.

9. A vehicle seat calibration data preservation apparatus according to claim 6 further comprising the steps:

(j) means, responsive to there being no vehicle identification data stored in the first rewritable, non-volatile memory, for determining if there is seat calibration data stored in the first rewritable, non-volatile memory;

(k) means, responsive to there being no seat calibration data stored in the first rewritable, non-volatile memory, for determining if the vehicle identification data obtained from the vehicle matches vehicle identification data stored in the second rewritable, non-volatile memory; and (l) means, responsive to the vehicle identification data obtained from the vehicle matching vehicle identification data stored in the second rewritable, non-volatile memory, for copying vehicle identification data stored in the second rewritable, non-volatile memory and one of the vehicle identification data obtained from the vehicle and the vehicle identification data stored in the second rewritable, non-volatile memory to the first rewritable, non-volatile memory.

10. A vehicle seat calibration data preservation apparatus according to claim 6 further comprising an airbag control module containing the second rewritable, non-volatile memory and being separately replaceable in the vehicle with respect to the occupant detection system module.

* * * * *

UNITED STATES PATENT AND TRADEMARK OFFICE
CERTIFICATE OF CORRECTION

PATENT NO. : 6,650,978 B1
DATED : November 18, 2003
INVENTOR(S) : Patterson et al.

It is certified that error appears in the above-identified patent and that said Letters Patent is hereby corrected as shown below:

<u>Title page,</u>
Item [73], Assignee, should read -- Daimler Chrysler Corporation --

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,650,978 B1
DATED : November 18, 2003
INVENTOR(S) : Patterson et al.

It is certified that error appears in the above-identified patent and that said Letters Patent is hereby corrected as shown below:

Title page,
Item [73], Assignee, should read -- Daimler Chrysler Corporation, Auburn Hills, MI (US) and Delphi Technologies, Inc., Troy, MI (US) --

This certificate supersedes Certificate of Correction issued August 10, 2004.

Signed and Sealed this

Twenty-first Day of December, 2004

JON W. DUDAS
*Director of the United States Patent and Trademark Office*